No. 892,546. PATENTED JULY 7, 1908.
L. N. PERKINS.
HOPPLE.
APPLICATION FILED OCT. 29, 1907.
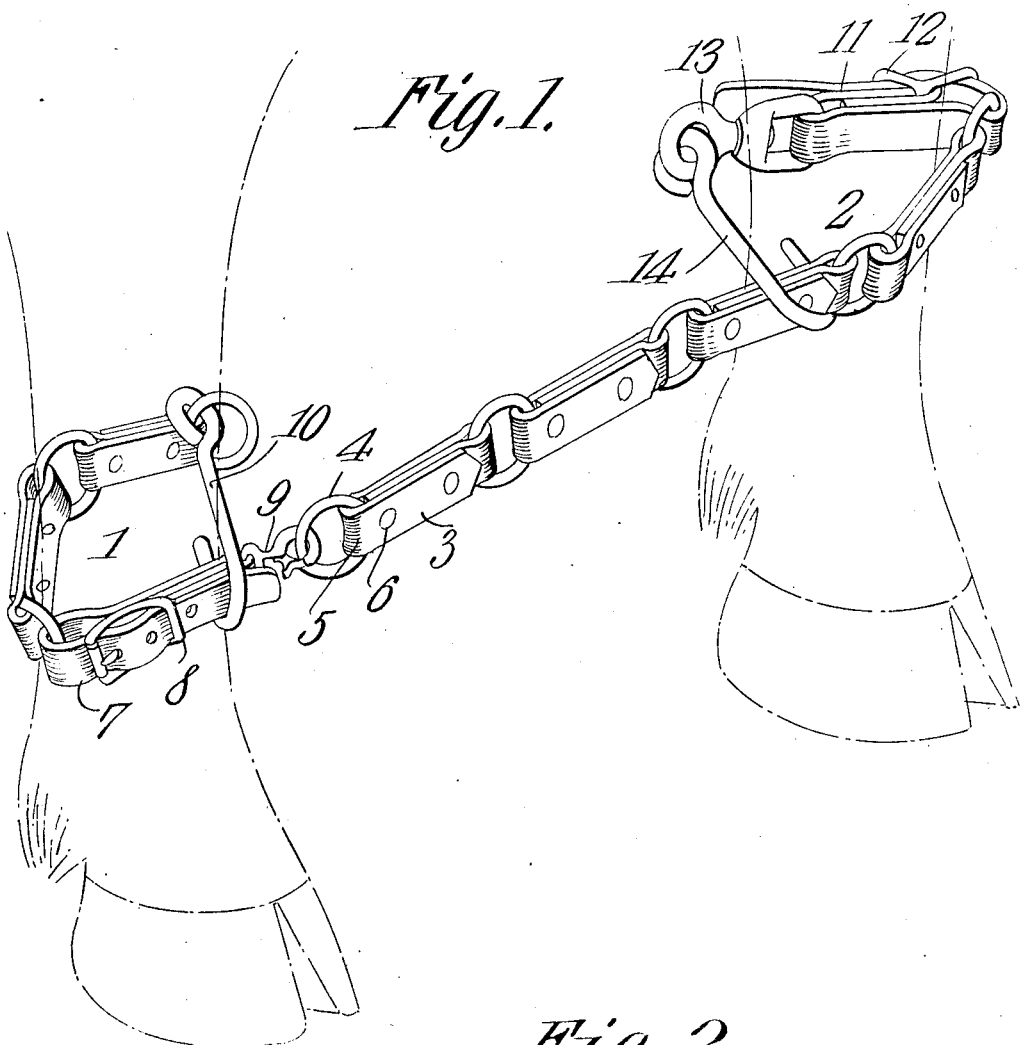
Witnesses
E. H. Stewart
O. Daniels
Louis N. Perkins, Inventor
By C. A. Snow & Co.
Attorneys

UNITED STATES PATENT OFFICE.

LOUIS NELSON PERKINS, OF JOHN DAY, OREGON.

HOPPLE.

No. 892,546.      Specification of Letters Patent.      Patented July 7, 1908.

Application filed October 29, 1907. Serial No. 399,674.

*To all whom it may concern:*

Be it known that I, LOUIS NELSON PERKINS, a citizen of the United States, residing at John Day, in the county of Grant and State of Oregon, have invented a new and useful Hopple, of which the following is a specification.

This invention has relation to improvements in devices commonly known as hopples and it consists in the novel construction and arrangement of its parts as hereinafter shown and described.

The object of the invention is to provide a simple and substantial hopple adapted to be applied to the legs or ankles of a fractious animal to prevent kicking or plunging.

The hopple consists of two separable parts each of which is adapted to be applied to a leg and one of which is provided with a snap hook which is adapted to engage a ring provided upon the other member of the hopple. The members of the hopple are made up of a series of leather links and iron rings and each member is provided with a terminal hook and a strap and buckle for increasing or diminishing its length while one of the members of the hopple is provided with a swivel for preventing the parts from becoming twisted.

Figure 1 is a perspective view of the hopple and, Fig. 2 is a sectional view of a portion of the same.

The hopple consists of the relatively short member 1 and the relatively long member 2, each member is made up of a series of leather links 3 and iron rings 4. The links 3 are made up of strips having the eyes 5 formed at their opposite ends and which receive the rings 4, the ends of the said strips being secured in place by the rivets 6 which also perform functions in holding the rings 4 in proper positions in the eyes 5. The strips from the links 3 are formed and so folded that their end portions lie upon the outer side of the hopple and consequently, the smooth sides of the links are presented toward the legs of the animal. The member 1 is provided with a strap 7 upon which is mounted a buckle 8, said strap may be lengthened or shortened to adjust the length of the member 1. The strap 7 is provided with a snap hook 9 and the hook 10 is attached to the ring 4 located at the other end of the member 1. The strap 11 is attached to the member 2 and is provided with a buckle 12 by means of which the said strap may be lengthened or shortened. The swivel 13 is attached to the strap 11 and the hook 14 is attached to one of the members of the swivel 13 whereby means is provided which enables the hook 14 to turn axially with relation to the member 2.

The swivel 13 prevents the hopple from becoming twisted when it is being applied to the legs of an animal as the eye of the said swivel may be turned axially so that the hook 14 may properly engage the hopple member 2. In applying the hopple the member 1 is carried around one leg of the animal and the hook 10 is caught over the said member at a point intermediate of the ends thereof. The member 2 is then carried around the other leg of the animal and the hook 14 is caught over the last said member at a point intermediate of the ends thereof. The snap hook 9 is then caught into engagement with the ring 4 at the end of the member 2. Thus, the two members of the hopple are connected together and the device prevents the animal from kicking or plunging. It will be seen that a durable and simple hopple is provided which may be quickly applied and quickly detached from the animal without requiring bands to be buckled about the legs as the hooks 10 and 14 may slide longitudinally along the respective members of the hopple to which they are attached whereby the said members will fit snugly around the animal's legs.

Having described my invention what I claim as new and desire to secure by Letters-Patent is:—

1. A hopple, hooks located at the ends thereof and adapted to receive intermediate portions of the hopple.

2. A hopple, hooks located at the ends thereof and adapted to receive intermediate portions of the hopple and a swivel mounted upon the hopple at a point between the hooks.

3. A hopple consisting of a series of flexible links joined together by a series of metallic rings and hooks located at the ends of the hopple.

4. A hopple consisting of a series of flexible links made up of strips having their ends riveted at intermediate portions and forming eyes, metallic rings held by the eyes and hooks located at the ends of the hopple.

5. A hopple comprising two members made up of flexible links and metallic rings, a snap hook attached to one of the members and a hook carried by each member, the last said hooks being adapted to receive intermediate portions of the hopple.

6. A hopple consisting of two members made up of flexible links and metallic rings, a snap hook attached to one member, a swivel attached to the other member and hooks carried by both members the last said hooks being adapted to receive intermediate portions of the hopple.

7. A hopple consisting of a relatively long and a relatively short member, a separable means for connecting the members together and hooks attached to the members and adapted to receive intermediate portions of the hopple.

In testimony that I claim the foregoing as my own, I have hereto affixed my signature in the presence of two witnesses.

LOUIS NELSON PERKINS.

Witnesses:
    JOHN W. AMBROSE,
    WM. H. SCHROEDER.